(12) United States Patent
Hamaya

(10) Patent No.: US 12,451,262 B2
(45) Date of Patent: Oct. 21, 2025

(54) CONTROL SWITCHING DEVICE

(71) Applicant: Mitsubishi Electric Corporation, Tokyo (JP)

(72) Inventor: Yoichiro Hamaya, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 424 days.

(21) Appl. No.: 18/245,007

(22) PCT Filed: Nov. 30, 2020

(86) PCT No.: PCT/JP2020/044516
§ 371 (c)(1),
(2) Date: Mar. 13, 2023

(87) PCT Pub. No.: WO2022/113345
PCT Pub. Date: Jun. 2, 2022

(65) Prior Publication Data
US 2023/0352200 A1  Nov. 2, 2023

(51) Int. Cl.
*G21D 3/04* (2006.01)
*G21D 3/06* (2006.01)
(52) U.S. Cl.
CPC .............. *G21D 3/04* (2013.01); *G21D 3/06* (2013.01)
(58) Field of Classification Search
CPC .................................. G21D 3/04; G21D 3/06
See application file for complete search history.

(56) References Cited

U.S. PATENT DOCUMENTS

| 2010/0234968 A1* | 9/2010 | Kurachi | G05B 9/02 700/21 |
| 2013/0202074 A1* | 8/2013 | Fujimoto | G21D 3/04 376/215 |

FOREIGN PATENT DOCUMENTS

| JP | 2012083232 A | 4/2012 |
| JP | 2016045166 A | 4/2016 |

OTHER PUBLICATIONS

International Search Report (PCT/ISA/210) with translation and Written Opinion (PCT/ISA/237) mailed on Feb. 9, 2021, by the Japan Patent Office as the International Searching Authority for International Application No. PCT/JP2020/044516. (10 pages).

* cited by examiner

*Primary Examiner* — Benyam Haile
(74) *Attorney, Agent, or Firm* — BUCHANAN, INGERSOLL & ROONEY PC

(57) ABSTRACT

This control switching device includes: a first operating panel provided at a first place and having A1, A2 buttons connected to a first control device and B1, B2 buttons connected to a second control device; and a second operating panel provided at a second place and having a1, a2 buttons connected to the first control device and b1, b2 buttons connected to the second control device. The first control device includes a first determination circuitry which determines whether to shut down input/output to/from an input/output device located at the first place, using operation signals of the A1, A2, B1, B2 buttons from the first operating panel. The second control device also includes a second determination circuitry similar to the first determination circuitry.

20 Claims, 11 Drawing Sheets

100

100

CONTROL SWITCHING DEVICE

TECHNICAL FIELD

The present disclosure relates to a control switching device.

BACKGROUND ART

A device (hereinafter, simply referred to as control switching device) for control switching to remote shutdown equipment (a nuclear reactor shutdown apparatus outside a nuclear reactor control room) from a main control room in a conventional nuclear power plant is provided at a place in a different fire protection area from the main control room, assuming that the main control room might be unable to be used immediately due to fire or the like. In a case where the provided location of only one control switching device is other than the main control room, there is a possibility that unnecessary switching from the main control room to the remote shutdown equipment occurs because of an erroneous operation by a person or an erroneous signal due to short-circuit of an operation button of the control switching device or the like. As a measure therefor, it has been proposed that such control switching devices are provided at two locations (see, for example, Patent Document 1).

CITATION LIST

Patent Document

Patent Document 1: Japanese Laid-Open Patent Publication No. 2012-83232

SUMMARY OF THE INVENTION

Problems to be Solved by the Invention

Conventional control switching devices, including the above proposed measure of providing control switching devices at two locations, are configured to switch control by operating one button for switching operation, and thus the system is not multiplexed. Therefore, there is a problem that the control switching device might erroneously work or might not work, because of a failure due to a single factor.

The present disclosure has been made to solve the above problem, and an object of the present disclosure is to provide a control switching device capable of preventing inadvertent (malicious) switching of a monitoring control function from a first place to a second place.

Solution to the Problems

A control switching device according to the present disclosure is a control switching device for switching input/output to/from duplicated control devices from an input/output device located at a first place to an input/output device located at a second place, the control switching device including: a first operating panel having an A1 button and an A2 button connected to a first control device as the control device, and a B1 button and a B2 button connected to a second control device as the control device, the first operating panel being provided at the first place; a second operating panel having an a1 button and an a2 button connected to the first control device, and a b1 button and a b2 button connected to the second control device, the second operating panel being provided at the second place; and a network via which an operation signal of each button is sent/received between the first control device and the second control device. The first control device includes a first determination unit which determines whether or not to shut down input/output between the first control device and the input/output device located at the first place, on the basis of the operation signals of the A1 button, the A2 button, the B1 button, and the B2 button from the first operating panel, and determines whether or not to start input/output between the first control device and the input/output device located at the second place, on the basis of the operation signals of the a1 button, the a2 button, the b1 button, and the b2 button from the second operating panel. The second control device includes a second determination unit which determines whether or not to shut down input/output between the second control device and the input/output device located at the first place, on the basis of the operation signals of the A1 button, the A2 button, the B1 button, and the B2 button from the first operating panel, and determines whether or not to start input/output between the second control device and the input/output device located at the second place on the basis of the operation signals of the a1 button, the a2 button, the b1 button, and the b2 button from the second operating panel.

Effect of the Invention

The control switching device according to the present disclosure is capable of preventing inadvertent (malicious) switching of a monitoring control function from a first place to a second place.

DESCRIPTION OF EMBODIMENTS

Embodiment 1

Hereinafter, a control switching device (hereinafter, simply referred to as control switching device) according to embodiment 1 will be described with reference to the drawings. In the present embodiment, an example in which, at the time of emergency, control of a plant such as a nuclear reactor is switched from a main control room (first place) to nuclear reactor shutdown equipment (second place) provided outside thereof, will be described.

Figure 1:
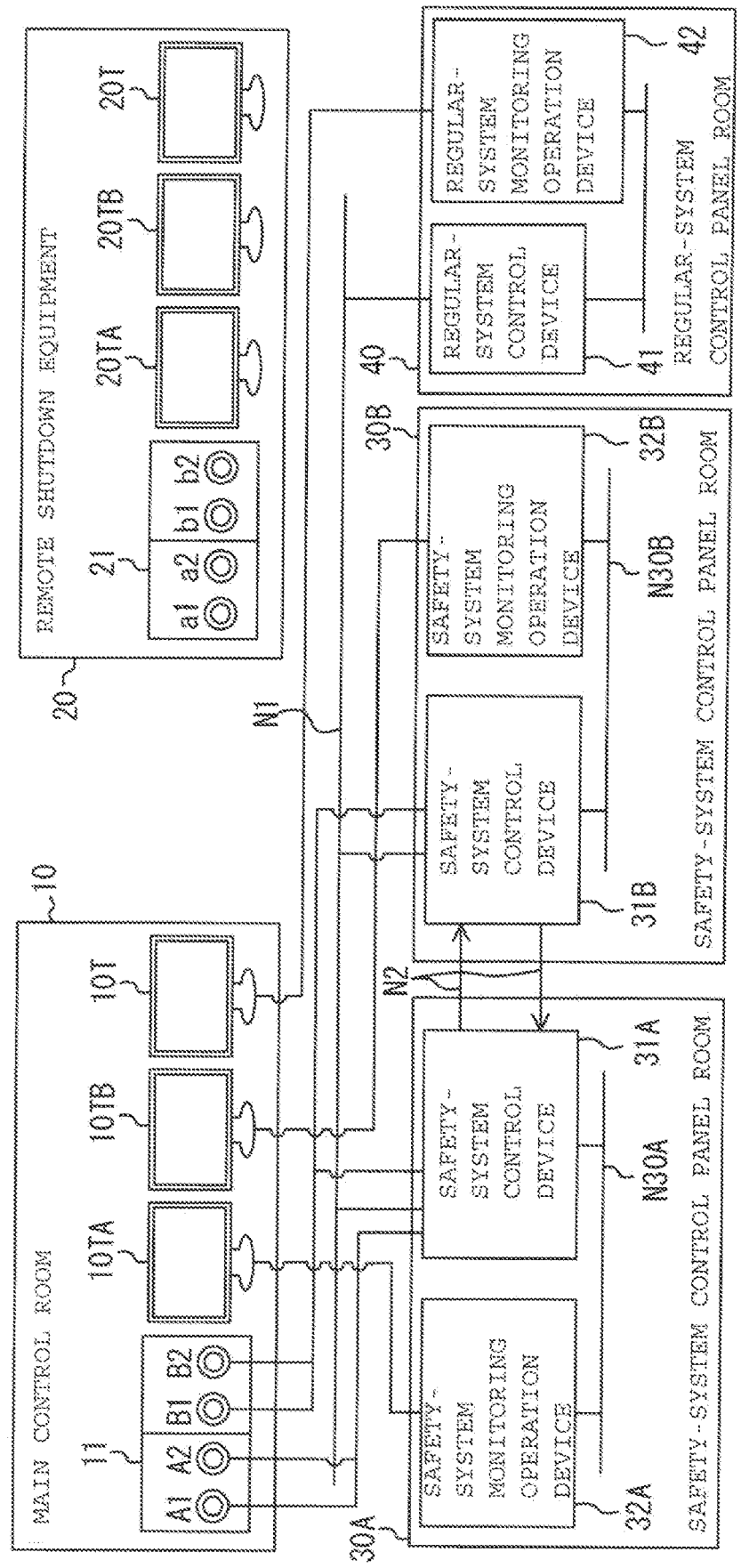
FIG. 1 is a conceptual diagram showing the configuration of a control device for nuclear power plant in which a control switching device is incorporated, according to embodiment 1.

FIG. 1 is a conceptual diagram showing the configuration of a control device for a nuclear power plant 100, in which a redundantly-configured equipment control switching device is incorporated. For convenience of description, wiring of remote shutdown equipment 20 is not shown.

Figure 2:
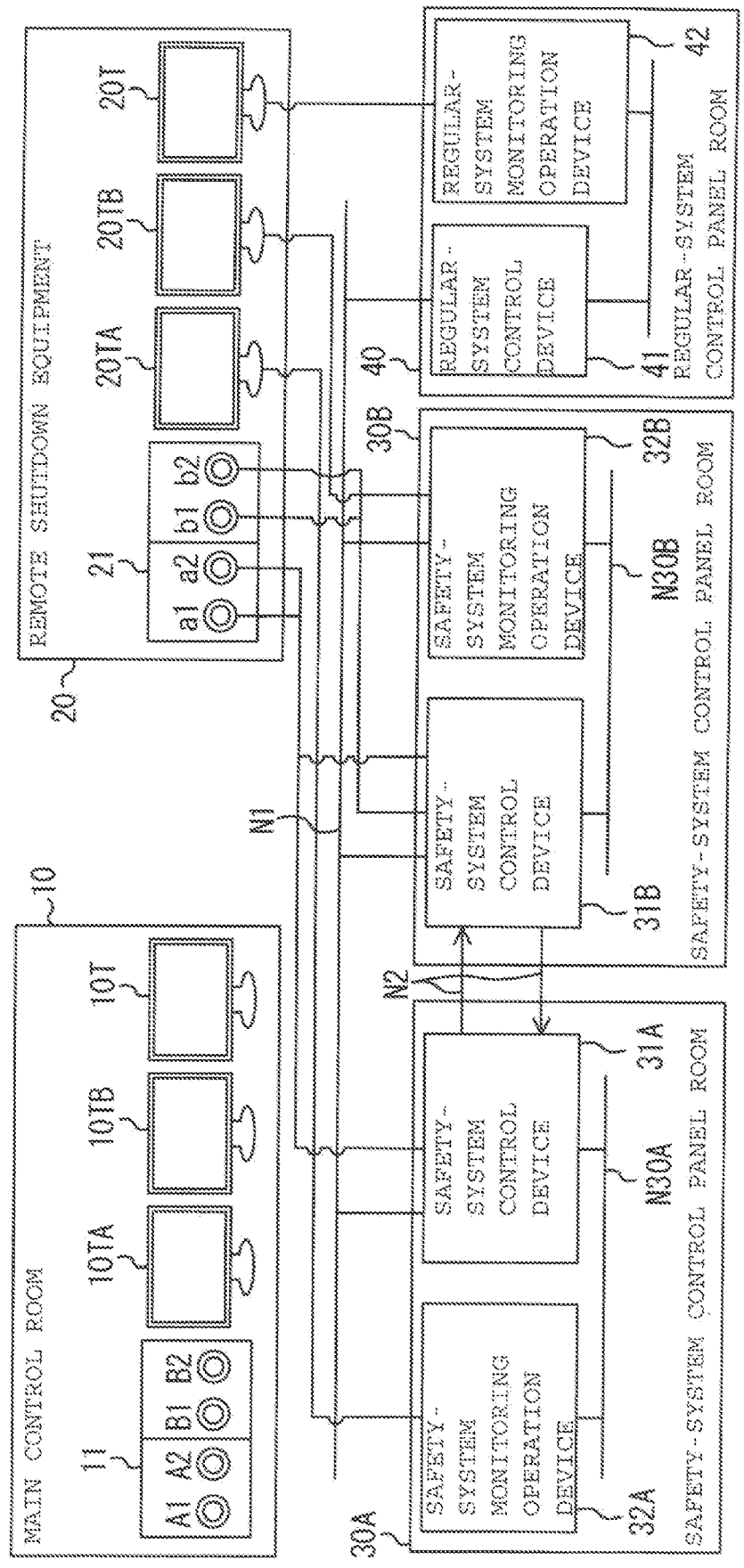
FIG. 2 is a conceptual diagram showing the configuration of the control device for nuclear power plant in which the control switching device is incorporated, according to embodiment 1.

FIG. 2 is a conceptual diagram showing the configuration of the control device for the nuclear power plant 100, in which the redundantly-configured equipment control switching device is incorporated. For convenience of description, wiring of a main control room 10 is not shown. Therefore, in actuality, the wirings in both of FIG. 1 and FIG. 2 are present.

Figure 3:
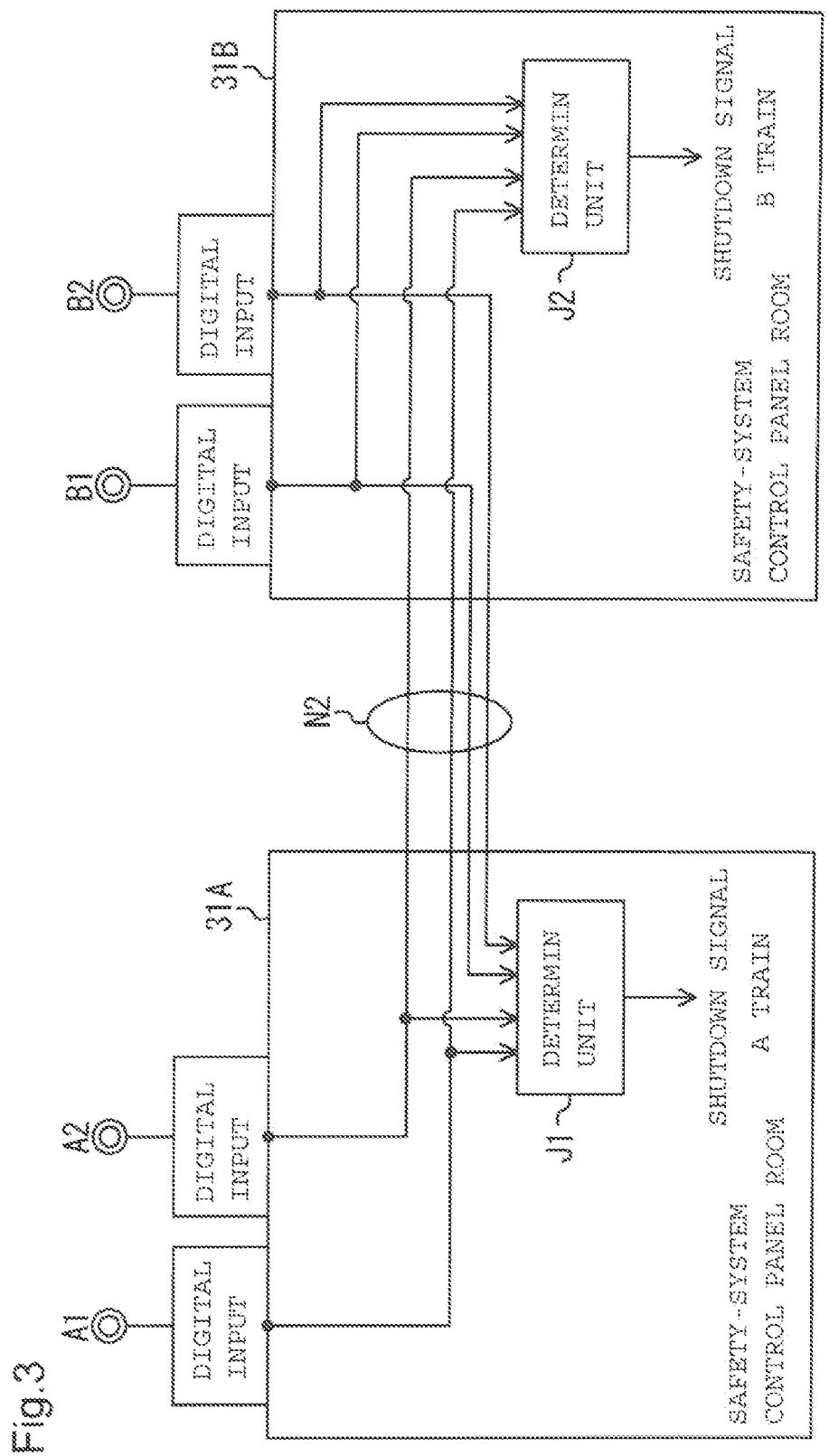
FIG. 3 is a circuit diagram showing the connection states of buttons of a first operating panel according to embodiment 1.

FIG. 3 is a circuit diagram showing the connection states of buttons of an operating panel 11 (first operating panel).

Figure 4:
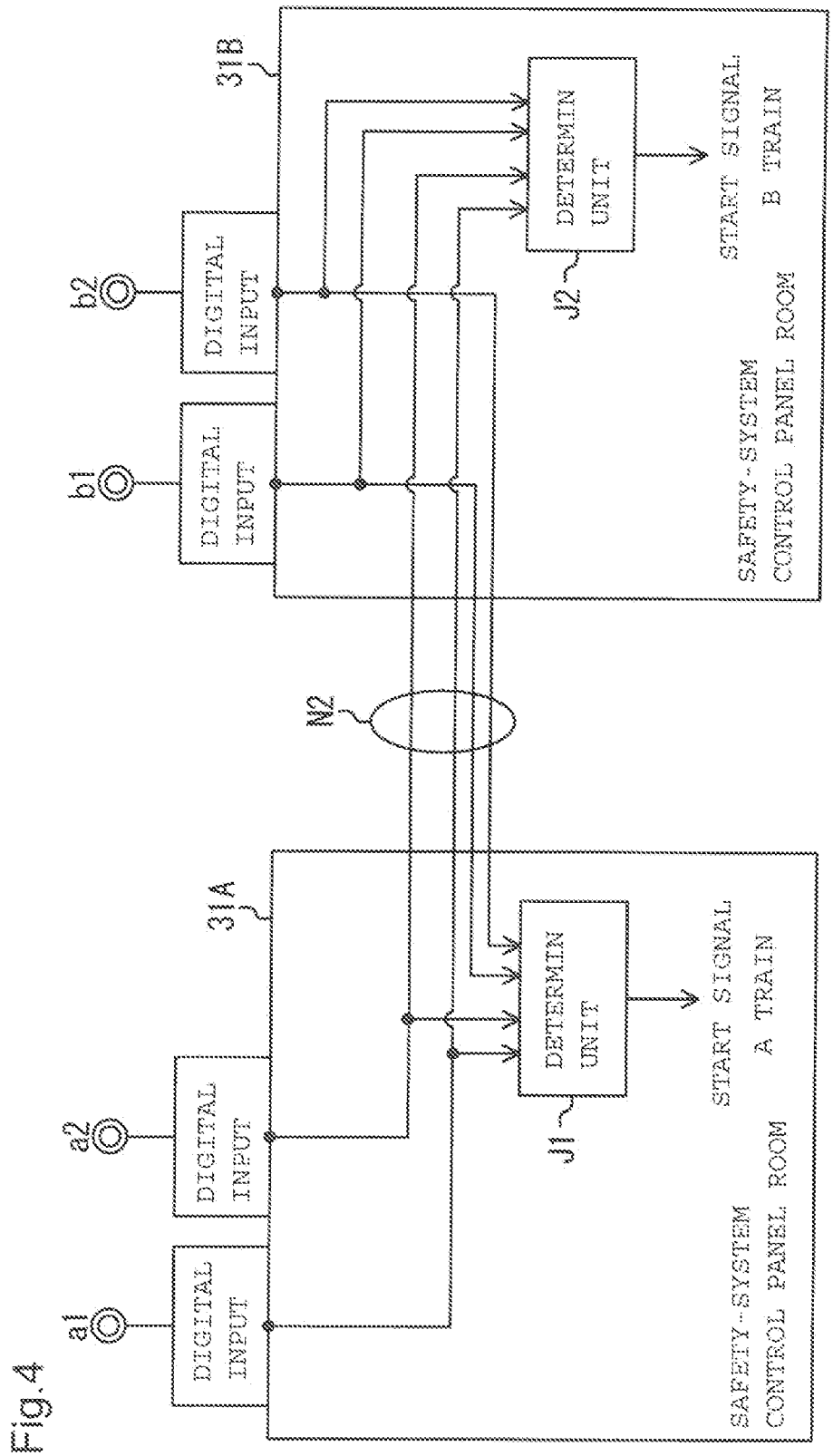
FIG. 4 is a circuit diagram showing the connection states of buttons of a second operating panel according to embodiment 1.

FIG. 4 is a circuit diagram showing the connection states of buttons of an operating panel 21 (second operating panel).

As shown in FIG. 1 and FIG. 2, the nuclear power plant 100 includes the main control room (MCR) 10, the remote shutdown equipment 20, a safety-system control panel room 30A, a safety-system control panel room 30B, and a regular-system control panel room 40. The main control room 10 is a control room used for controlling operations of a nuclear reactor and a peripheral plant in a normal case. The remote shutdown equipment 20 is equipment used for switching a function of controlling devices, etc., for performing emergency shutdown of the nuclear reactor, from the main control room 10, and controlling these, at the time of emergency. The safety-system control panel room 30A and the safety-system control panel room 30B are provided with devices for performing monitoring control relevant to integrity of the nuclear power plant 100.

The safety-system control panel room 30A is provided with a safety-system control device 31A (first control device) for performing control relevant to a safety system of the nuclear power plant 100, and a safety-system monitoring operation device 32A for performing monitoring and operation of the safety-system control device 31A. The safety-system control device 31A includes a determination unit J1 (first determination unit) described in detail later. Similarly, the safety-system control panel room 30B is provided with a safety-system control device 31B for performing control relevant to the safety system of the nuclear power plant 100, and a safety-system monitoring operation device 32B for performing monitoring and operation of the safety-system control device 31B (second control device). The safety-system control device 31B includes a determination unit J2 (second determination unit) described in detail later. The safety-system control device 31A and the safety-system control device 31B are configured in a redundant manner, i.e., a duplicated manner, so that integrity of the nuclear power plant 100 can be ensured even if one of the devices becomes abnormal.

The regular-system control panel room 40 is provided with a regular-system control device 41 for performing normal control of a system other than the safety system of the nuclear power plant 100, and a regular-system monitoring operation device 42 for performing monitoring and operation of the regular-system control device 41.

In the main control room 10, a touch panel 10T, a touch panel 10TA, and a touch panel 10TB (input/output devices) are provided. The touch panel 10T is connected to the regular-system monitoring operation device 42 provided in the regular-system control panel room 40, the touch panel 10TA is connected to the safety-system monitoring operation device 32A provided in the safety-system control panel room 30A, and the touch panel 10TB is connected to the safety-system monitoring operation device 32B provided in the safety-system control panel room 30B. Further, in the main control room 10, an operating panel 11 for switching connection with the safety-system monitoring operation device 32A, the safety-system monitoring operation device 32B, and the regular-system monitoring operation device 42, from the main control room 10 to the remote shutdown equipment 20, is provided.

In the remote shutdown equipment 20, as in the main control room 10, a touch panel 20T, a touch panel 20TA, and a touch panel 20 TB (input/output devices) are provided. Further, in the remote shutdown equipment 20, an operating panel 21 for switching connection with the safety-system monitoring operation device 32A, the safety-system monitoring operation device 32B, and the regular-system monitoring operation device 42, from the main control room 10 to the remote shutdown equipment 20, is provided.

When the connection is switched, the touch panel 20T is connected to the regular-system monitoring operation device 42 provided in the regular-system control panel room 40, the touch panel 20TA is connected to the safety-system monitoring operation device 32A provided in the safety-system control panel room 30A, and the touch panel 20 TB is connected to the safety-system monitoring operation device 32B provided in the safety-system control panel room 30B.

Next, communication networks between the devices in FIG. 1 and FIG. 2 will be described. The regular-system control device 41, the safety-system control device 31A, and the safety-system control device 31B are connected via a network N1 for performing data communication. The safety-system control device 31A and the safety-system control device 31B are connected via a network N2 for performing dedicated data communication in a safety-system train (device group relevant to safety system). The network N2 is formed by two communication cables (from safety-system control device 31A to safety-system control device 31B and from safety-system control device 31B to safety-system control device 31A), for unidirectional communication. The safety-system control device and the safety-system monitoring operation device in the same train, i.e., the safety-system control device 31A and the safety-system monitoring operation device 32A are connected via a network N30A, and the safety-system control device 31B and the safety-system monitoring operation device 32B are connected via a network N30B.

Next, the configurations of the operating panel 11 and the operating panel 21 will be described.

The safety-system control devices of the nuclear power plant 100 are configured by equipment in two or more systems that are physically, electrically, and mechanically separate and independent of each other, in order to satisfy a single failure standard which is regulatory requirement (here, two systems are assumed and these systems are referred to as A train and B train, respectively).

Equipment in the two systems has the same function, measurement equipment such as sensors, auxiliary devices such as pumps, and the like are all duplicated, and they are connected to the safety-system control device 31A, 32B corresponding to the respective systems.

The operating panel 11 and the operating panel 21 are also devices in two systems that are physically, electrically, and mechanically separate and independent of each other. Further, the operating panel 11 has two buttons for switching connection of the A train, and also has two buttons for switching connection of the B train. Similarly, the operating panel 21 has two buttons for switching connection of the A train, and also has two buttons for switching connection of the B train.

Specifically, the operating panel 11 has an A1 button and an A2 button for the A train, and a B1 button and a B2 button for the B train. The operating panel 21 has an a1 button and an a2 button for the A train, and a b1 button and a b2 button for the B train.

When the A1 button and the A2 button of the operating panel 11 are each operated, an operation signal is inputted to a digital input card of the safety-system control device 31A, and when the B1 button and the B2 button of the operating panel 11 are each operated, an operation signal is inputted to a digital input card of the safety-system control device 31B.

Similarly, when the a1 button and the a2 button of the operating panel 21 are each operated, an operation signal is inputted to a digital input card of the safety-system control device 31A, and when the b1 button and the b2 button of the operating panel 11 are each operated, an operation signal is inputted to a digital input card of the safety-system control device 31B.

Next, switching operation for control using the operating panel 11 and the operating panel 21 will be described.

First, a procedure for switching the monitoring control function from the main control room 10 to the remote shutdown equipment 20 during usage of the main control room 10, i.e., a method for shutting down input/output to/from the touch panel 10T, the touch panel 10TA, and the touch panel 10 TB and starting input/output to/from the touch panel 20T, the touch panel 20TA, and the touch panel 20 TB, will be described.

In order to switch the monitoring control function from the main control room 10 to the remote shutdown equipment 20, first, the A1, A2, B1, B2 buttons of the operating panel 11 in the main control room 10 are pressed. As described above, the operation signals of the A1 button and the A2 button of the operating panel 11 are inputted to the determination unit J1 of the safety-system control device 31A, and the operation signals of the B1 button and the B2 button are inputted to the determination unit J2 of the safety-system control device 31B. The safety-system control device 31A transmits the two inputted operation signals to the safety-system control device 31B via the network N2. Similarly, the safety-system control device 31B transmits the two inputted operation signals to the safety-system control device 31A via the network N2. Therefore, as long as the four buttons all work normally, four operation signals indicating that the four buttons of the operating panel 11 have been pressed are inputted to each of the determination unit J1 of the safety-system control device 31A and the determination unit J2 of the safety-system control device 31B. On the other hand, if any of the buttons has failed, the operation signal from the failed button does not arrive. In addition, if any button erroneously works, only the operation signal of the erroneously working button is inputted.

Next, the determination unit J1 of the safety-system control device 31A performs 2/4 voting operation (2-out-of-4 operation, hereinafter referred to as 2oo4 operation) on the operation signals that have arrived within a predetermined period since the first operation signal was received, and if a condition that two or more operation signals are inputted is satisfied, determines that an operator has performed switch operation.

Then, the safety-system control device 31A transmits a shutdown signal for shutting down monitoring control, to the regular-system control device 41, the regular-system monitoring operation device 42, the safety-system control device 31A (self-device), and the safety-system monitoring operation device 32A. Since the safety-system control device 31B is functionally independent of the safety-system control device 31A, the shutdown signal is not transmitted to the safety-system control device 31B.

Similarly, the determination unit J2 of the safety-system control device 31B performs 2/4 voting operation (2oo4 operation) on the operation signals that have arrived within a predetermined period since the first operation signal was received, and if a condition that two or more operation signals are inputted is satisfied, determines that the operator has performed switch operation.

Then, the safety-system control device 31B transmits a shutdown signal for shutting down monitoring control, to the regular-system control device 41, the regular-system monitoring operation device 42, the safety-system control device 31B (self-device), and the safety-system monitoring operation device 32B. Since the safety-system control device 31A is functionally independent of the safety-system control device 31B, the shutdown signal is not transmitted to the safety-system control device 31A.

When the condition is satisfied, the regular-system monitoring operation device 42 shuts down the monitoring operation function of the touch panel 10T, so that the monitoring operation function from the main control room 10 is disabled. However, switching to the touch panel 20T of the remote shutdown equipment 20 is not performed at this stage.

Similarly, when the condition is satisfied, the safety-system monitoring operation device 32A and the safety-system monitoring operation device 32B shut down the monitoring operation functions of the touch panel 10TA and the touch panel 10TB. However, switching to the touch panel 20TA and the touch panel 20 TB of the remote shutdown equipment 20 is not performed at this stage.

In addition, only when the condition is satisfied, the operating panel 21 provided in the remote shutdown equipment 20 becomes able to be operated. When another operation input is performed, the regular-system control device 41, the safety-system control device 31A, and the safety-system control device 31B invalidate this operation input.

After the operator moves to the remote shutdown equipment 20, the operator presses the a1, a2, b1, b2 buttons of the operating panel 21. As in the case of the operating panel 11, button operations on the a1 button and the a2 button of the operating panel 21 are inputted to the determination unit J1 of the safety-system control device 31A, and button operations on the b1 button and the b2 button are inputted to the determination unit J2 of the safety-system control device 31B. The safety-system control device 31A transmits the two inputted operation signals to the safety-system control device 31B via the network N2. Similarly, the safety-system control device 31B transmits the two inputted operation signals to the safety-system control device 31A via the network N2. Therefore, as long as the four buttons all work normally, four operation signals indicating that the four buttons of the operating panel 11 have been pressed are inputted to each of the determination unit J1 of the safety-system control device 31A and the determination unit J2 of the safety-system control device 31B. On the other hand, if any of the buttons has failed, the operation signal from the failed button does not arrive. In addition, if any button erroneously works, only the operation signal of the erroneously working button is inputted.

Next, the determination unit J1 of the safety-system control device 31A performs 2/4 voting operation (2oo4 operation) on the operation signals that have arrived within a predetermined period since the first operation signal was received, and if a condition that two or more operation signals are inputted is satisfied, determines that the operator has performed switch operation.

Then, the safety-system control device 31A transmits a start signal for starting monitoring control, to the regular-system control device 41, the regular-system monitoring operation device 42, the safety-system control device 31A (self-device), and the safety-system monitoring operation device 32A. Since the safety-system control device 31B is functionally independent of the safety-system control device 31A, the start signal is not transmitted to the safety-system control device 31B.

Similarly, the determination unit J2 of the safety-system control device 31B performs 2/4 voting operation (2oo4 operation) on the operation signals that have arrived within a predetermined period since the first operation signal was received, and if a condition that two or more operation signals are inputted is satisfied, determines that the operator has performed switch operation.

Then, the safety-system control device 31B transmits a start signal for starting monitoring control, to the regular-system control device 41, the regular-system monitoring operation device 42, the safety-system control device 31B (self-device), and the safety-system monitoring operation device 32B. Since the safety-system control device 31A is functionally independent of the safety-system control device 31B, the start signal is not transmitted to the safety-system control device 31A.

When having received the start signal from either the safety-system control device 31A or the safety-system control device 31B, the regular-system monitoring operation device 42 starts the monitoring operation function of the touch panel 10T.

Similarly, the safety-system monitoring operation device 32A and the safety-system monitoring operation device 32B for which the condition is satisfied also start the monitoring operation functions of the touch panel 10TA and the touch panel 10TB.

Next, a method for preventing erroneous working and function loss due to failure by 2oo4 operation will be described. If a control panel having only one button is used for each of the A train and the B train, loss of the switching function of one train occurs due to a single failure. In this case, if the network N2 is applied and an AND operation is performed using two operation signals, function loss occurs in the same manner as described above.

In a case where an OR operation is performed on two operation signals, there is no problem when failure (not working) has occurred in one train, but the A train and the B train are unnecessarily switched when failure (erroneous working) has occurred. On the other hand, as described in embodiment 1, in a case where two buttons are provided in each of the A train and the B train and 2oo4 operation is performed using the network N2 between the safety-system control devices 31A and 31B, when a single failure (erroneous working) has occurred in any of the A1 button, the A2 button, the B1 button, or the B2 button, 2oo4 operation is not satisfied in both of the A train and the B train, and thus erroneous working of a switching signal can be prevented.

Also when a single failure (not working) has occurred in any of the A1 button, the A2 button, the B1 button, or the B2 button, 2oo4 operation is satisfied in the A train and the B train by operation signals of the remaining three buttons, and thus loss of the switching function can be prevented.

In the present embodiment, the safety-system control device 31A and the safety-system monitoring operation device 32A are individually provided, the safety-system control device 31B and the safety-system monitoring operation device 32B are individually provided, and the regular-system control device 41 and the regular-system monitoring operation device 42 are individually provided. However, each set of devices may be integrated into one device.

In the control switching device according to embodiment 1, as described above, through button operations on the A1, A2, B1, B2 buttons of the operating panel 11, the touch panels provided in the main control room 10 are disabled and the operating panel 21 of the remote shutdown equipment 20 is enabled, and then, through subsequent button operations on the a1, a2, b1, b2 buttons of the operating panel 21, the touch panels of the remote shutdown equipment 20 are enabled at last. With such a configuration, inadvertent (malicious) switching of the monitoring operation function of the nuclear power plant 100 from the main control room 10 to the remote shutdown equipment 20 can be prevented.

In addition, also when a single failure has occurred on any operation button, it is possible to switch control to the remote shutdown equipment 20 provided outside the main control room 10, without losing the control switching function.

Embodiment 2

Hereinafter, a control switching device according to embodiment 2 will be described focusing on difference from embodiment 1.

In embodiment 2, a method for reinforcing functional independency between a safety-system control device 231A and a safety-system control device 231B configured in a redundant manner will be described with reference to FIG. 5 and FIG. 6.

Figure 5:
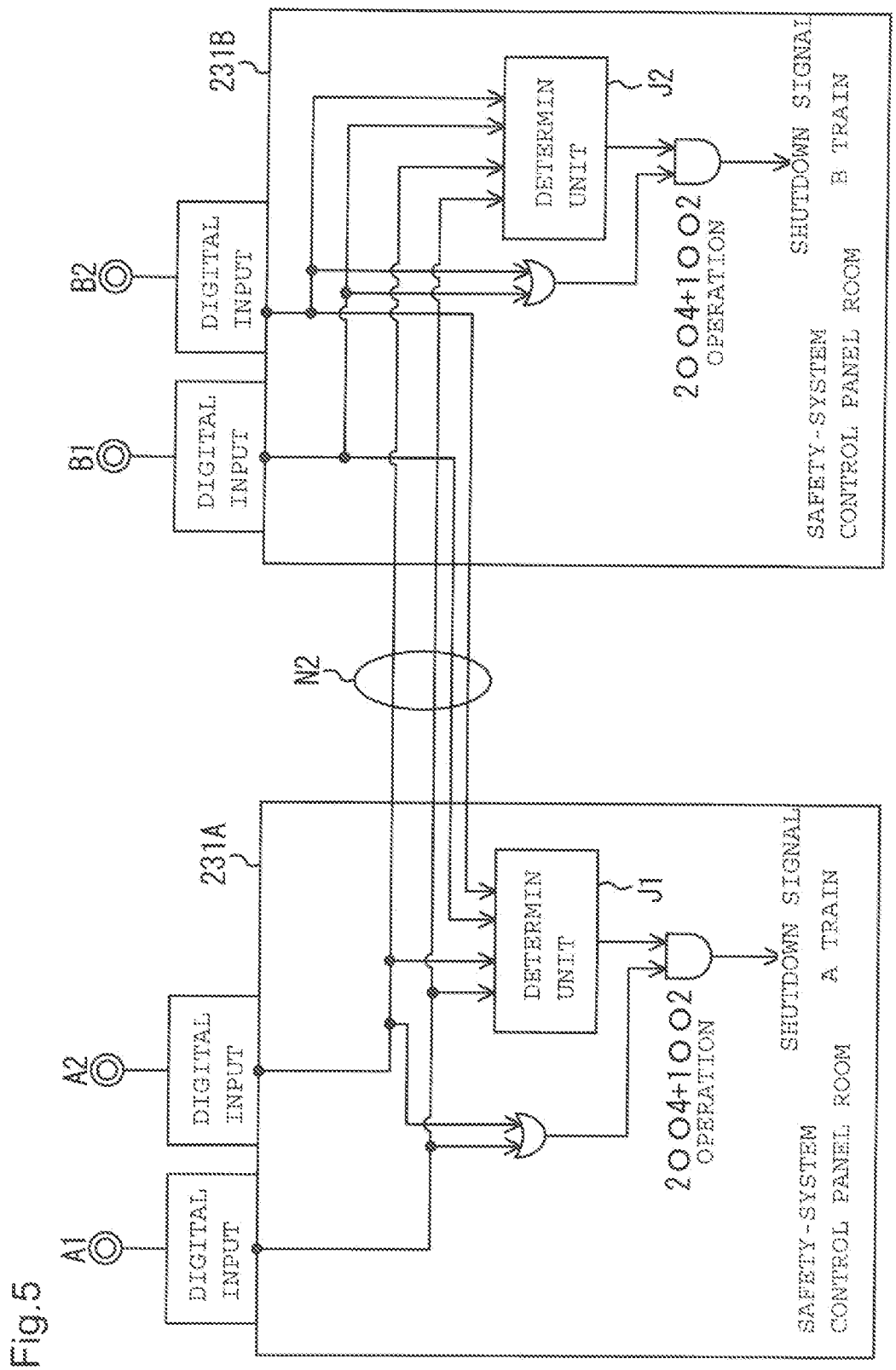
FIG. 5 is a circuit diagram showing the connection states of buttons of a first operating panel according to embodiment 2.

FIG. 5 is a circuit diagram showing the connection states of the buttons of the operating panel 11 in embodiment 2.

Figure 6:
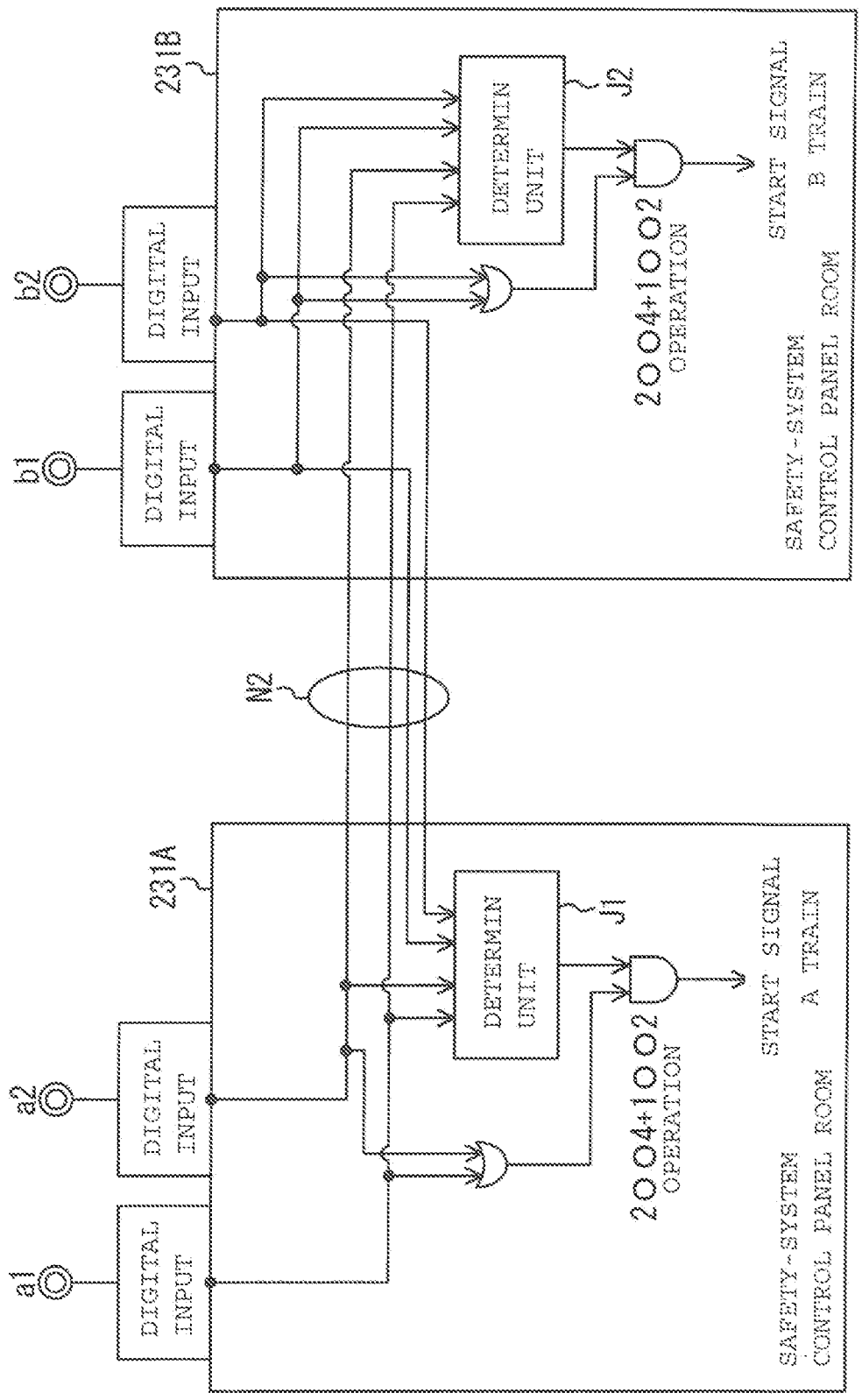
FIG. 6 is a circuit diagram showing the connection states of buttons of a second operating panel according to embodiment 2.

FIG. 6 is a circuit diagram showing the connection states of the buttons of the operating panel 21 in embodiment 2.

As in embodiment 1, also in embodiment 2, a shutdown signal and a start signal for the main control room 10 and the remote shutdown equipment 20 are generated through 2oo4 operation. However, there is a possibility that, when the B1 button and the B2 button in the B train of the operating panel 11 which are not electrically and physically independent of each other have failed (erroneously worked) due to a single factor, 2oo4 operation is satisfied in the A train and the B train via communication through the network N2, so that unnecessary switching operation of control occurs.

Accordingly, as means for preventing this, the determination units J1, J2 each perform an AND operation of an OR operation of two operation signals in the own train and the above-described 2oo4 operation (2oo4+1oo2 operation).

Specifically, in the determination unit J1 of the safety-system control device 231A, 2oo4 operation of inputs of the A1 button, the A2 button, the B1 button, and the B2 button is performed, and in addition, an OR operation of inputs of the A1 button and the A2 button is performed. Then, an AND operation of both results is performed, and if both conditions are satisfied, a shutdown signal is transmitted.

Thus, when the two buttons of the operating panel 11 in the B train have failed (erroneously worked) due to a single factor, 2oo4 operation is satisfied in both of the A train and the B train, but an OR operation for the A1 button and the A2 button is not satisfied in the A train, so that unnecessary switching of the A train can be prevented (erroneous working of the failed B train cannot be prevented).

Thus, the monitoring operation function using the touch panel 10TA in the A train can be maintained in the main control room 10, so that the minimum necessary plant monitoring operation function remains in the main control room 10, whereby operation of the nuclear power plant 100 can be continued. In the safety-system control device 231B, the determination unit J2 transmits a shutdown signal as a result of an AND operation of the 2oo4 operation result of inputs of the A1 button, the A2 button, the B1 button, and the B2 button and the OR operation result of inputs of the B1 button and the B2 button.

In the case of applying the above 2oo4+1oo2 operation, when two buttons of the operating panel 11 in one train (A train or B train) have failed (not worked) due to a single factor, switching of the failed train cannot be performed, but the function of the rest of the multiplexed trains is maintained and therefore there is no problem with integrity.

With the control switching device according to embodiment 2, even when two buttons in one train have failed due to a single factor, integrity of the nuclear power plant 100 can be maintained by one of the safety-system control devices.

Embodiment 3

A control switching device according to embodiment 3 will be described focusing on difference from embodiments 1 and 2.

Figure 7:
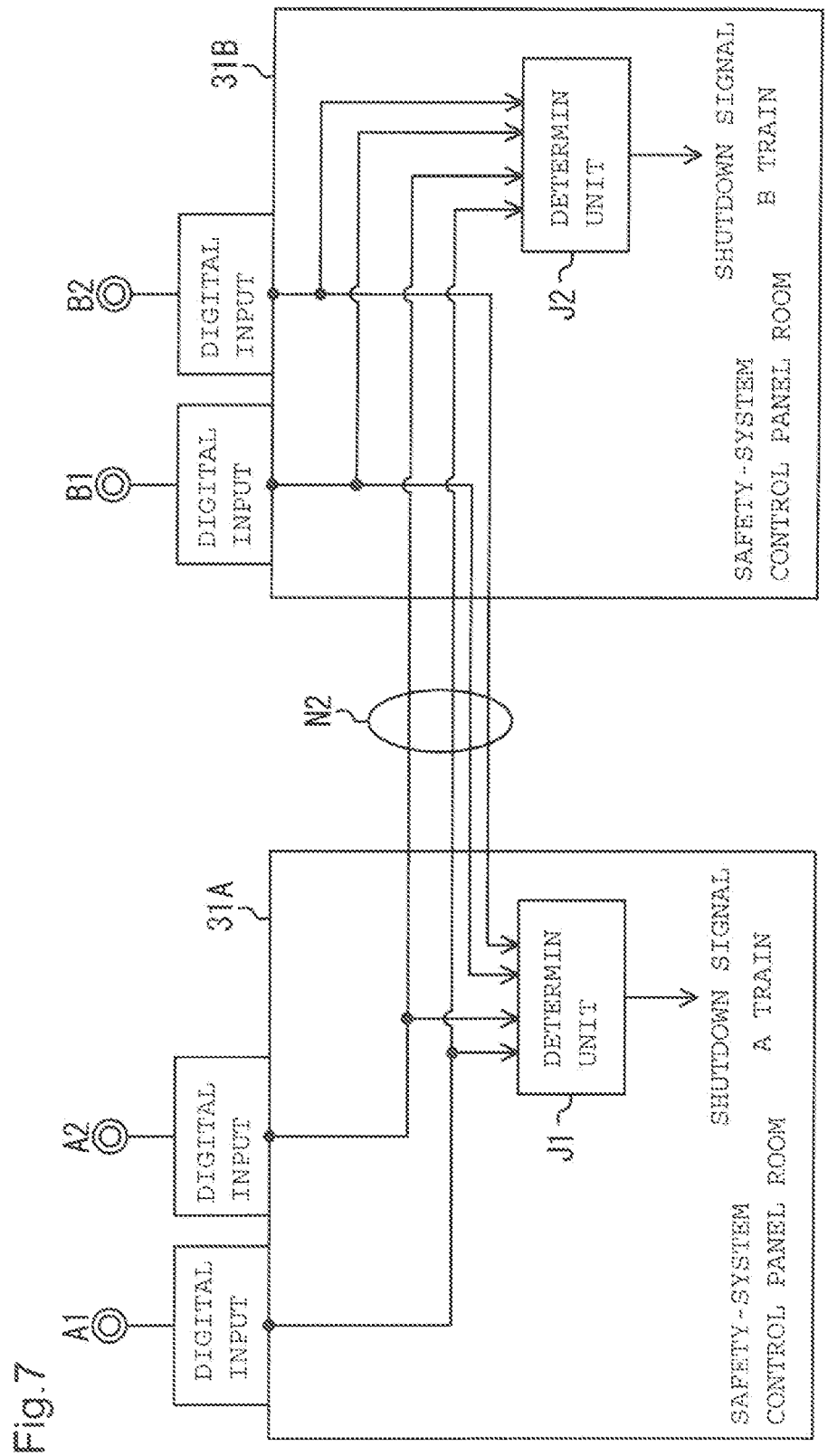
FIG. 7 is a circuit diagram showing the connection states of buttons of a first operating panel according to embodiment 3.

FIG. 7 is a circuit diagram showing the connection states of the buttons of the operating panel 11 in embodiment 3.

Figure 8:
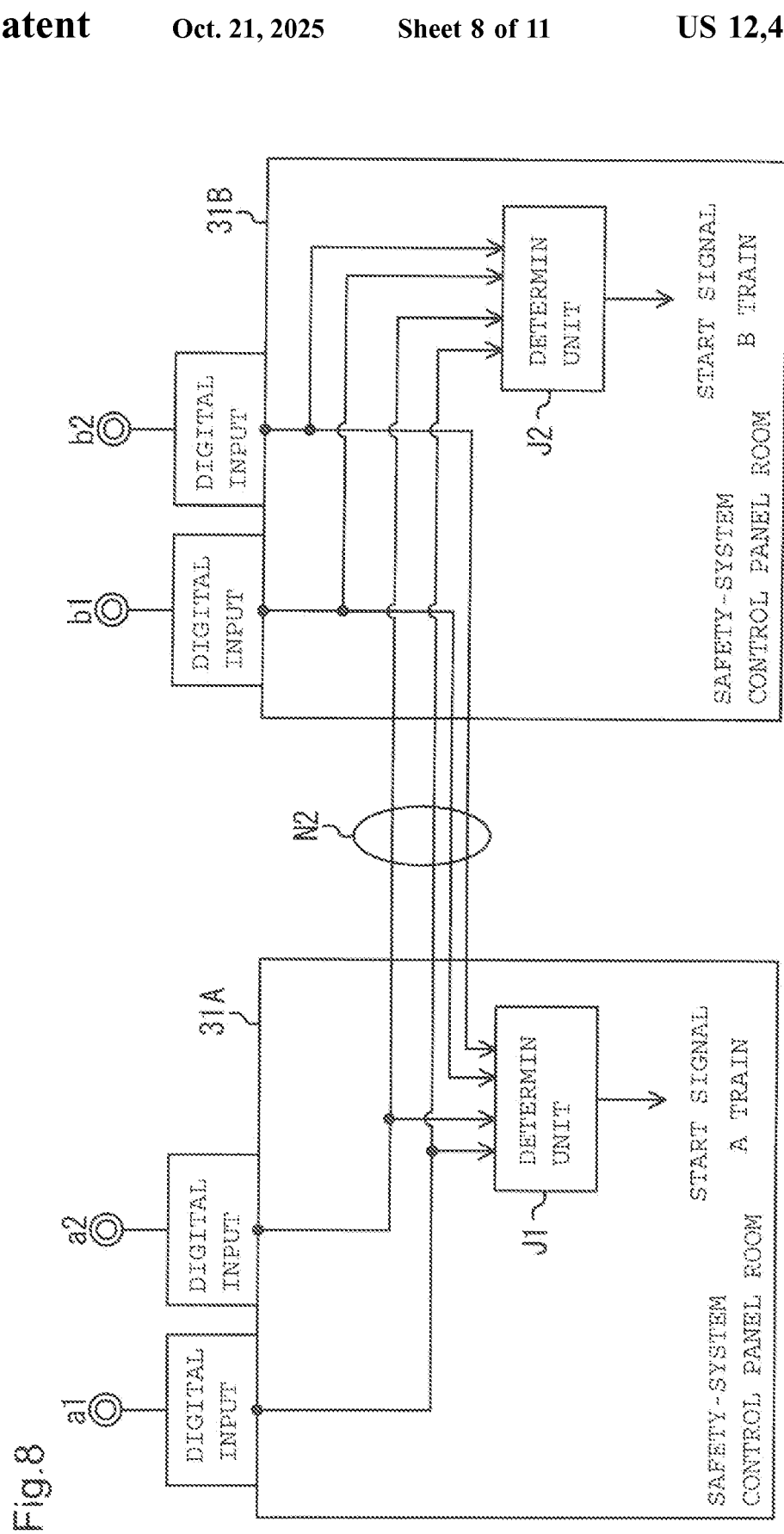
FIG. 8 is a circuit diagram showing the connection states of buttons of a second operating panel according to embodiment 3.

FIG. 8 is a circuit diagram showing the connection states of the buttons of the operating panel 21 in embodiment 3.

In the control switching device according to embodiment 2, there is a problem that erroneous switching of the B train cannot be prevented when two buttons of the operating panel 11 in the B train have failed (erroneously worked) due to a single factor.

Accordingly, in embodiment 3, the four buttons of each of the operating panels 11, 12 are all configured to be physically, electrically, and functionally separate and independent of each other, and instead of 2oo4 operation performed by the determination units J1, J2 in embodiment 1, 3oo4 operation is performed, i.e., when it is detected that three of the four buttons of each panel are pressed, it is determined that an operation by the operator has been performed. Thus, such a state that two buttons erroneously work or do not work due to a single factor can be eliminated, and even if one button erroneously works or does not work, it is possible to appropriately switch control of both trains.

Embodiment 4

Hereinafter, a control switching device according to embodiment 4 will be described focusing on difference from embodiment 1.

Figure 9:
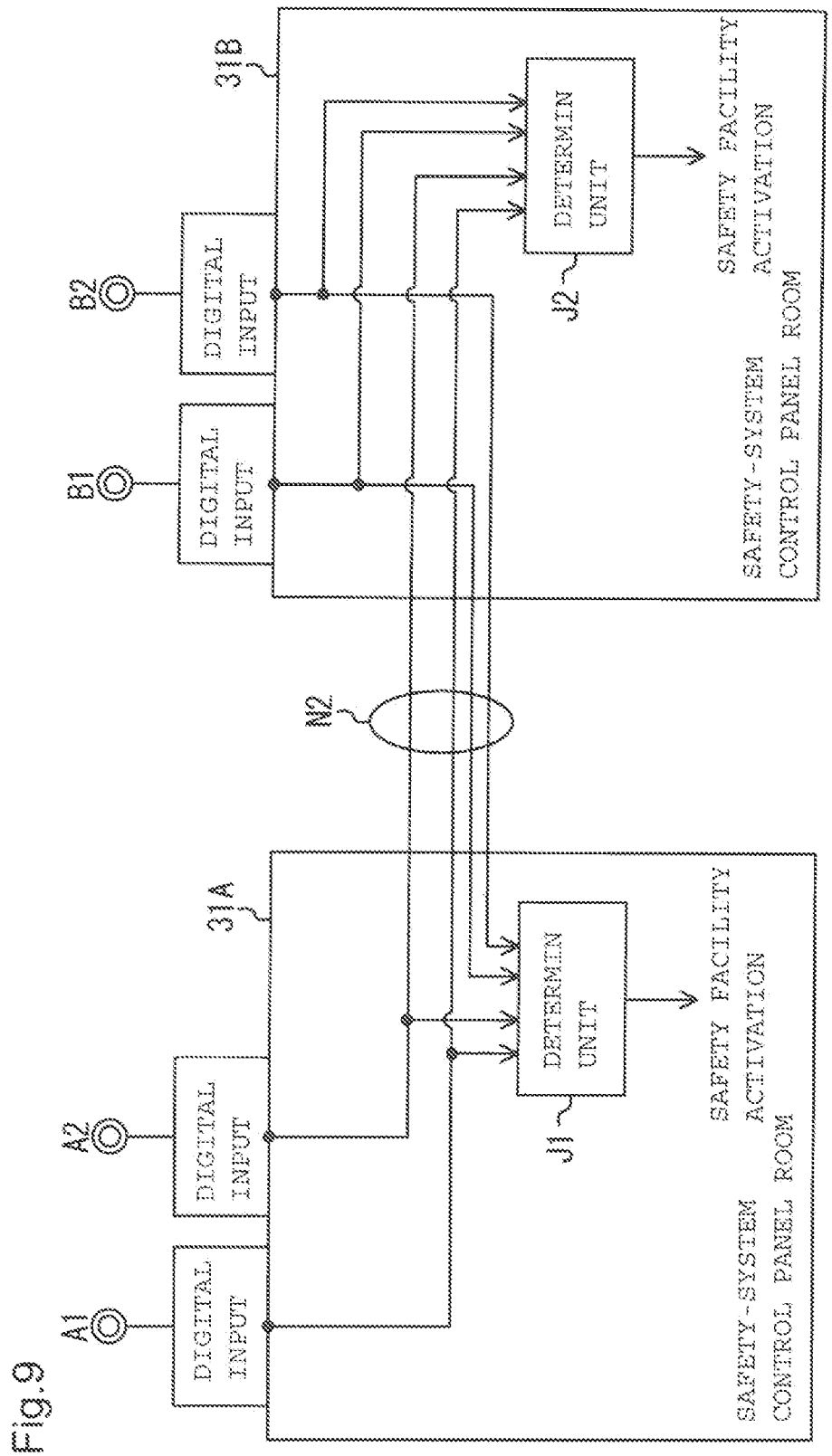
FIG. 9 is a circuit diagram showing the connection states of buttons of a first operating panel according to embodiment 4.

FIG. 9 is a circuit diagram showing the connection states of the buttons of the operating panel 11 in embodiment 4.

In embodiment 1, the operating panel 11 is provided with two buttons for each system, i.e., a total of four buttons, the operating panel 21 is provided with two buttons for each system, i.e., a total of four buttons, each of the determination units J1, J2 of the safety-system control devices 31A, 31B performs 2oo4 operation, and switching of control from the main control room 10 to the remote shutdown equipment 20 is performed. Such switching operation based on 2oo4 operation using the four buttons of each panel is applicable also to another function that requires erroneous working prevention and function loss prevention. For example, the above configuration can be used for manual operation switches of engineered safety features which, in a case where a fuel rod in the nuclear reactor of the nuclear power plant is damaged and there is a possibility that radioactive materials spread, prevent or suppress such things and ensure safety of the general public around the power plant and personnel of the power plant.

As described in embodiment 2, in a case where the determination units J1, J2 are not provided with the OR operation (1oo2 operation) for the own trains in addition to the 2oo4 operation, there is a possibility that erroneous working occurs due to failure of another train. However, operation of the engineered safety features is useful for plant protection and therefore such a configuration need not be applied.

Embodiment 5

Hereinafter, a control switching device according to embodiment 5 will be described focusing on difference from embodiment 1.

Figure 10:
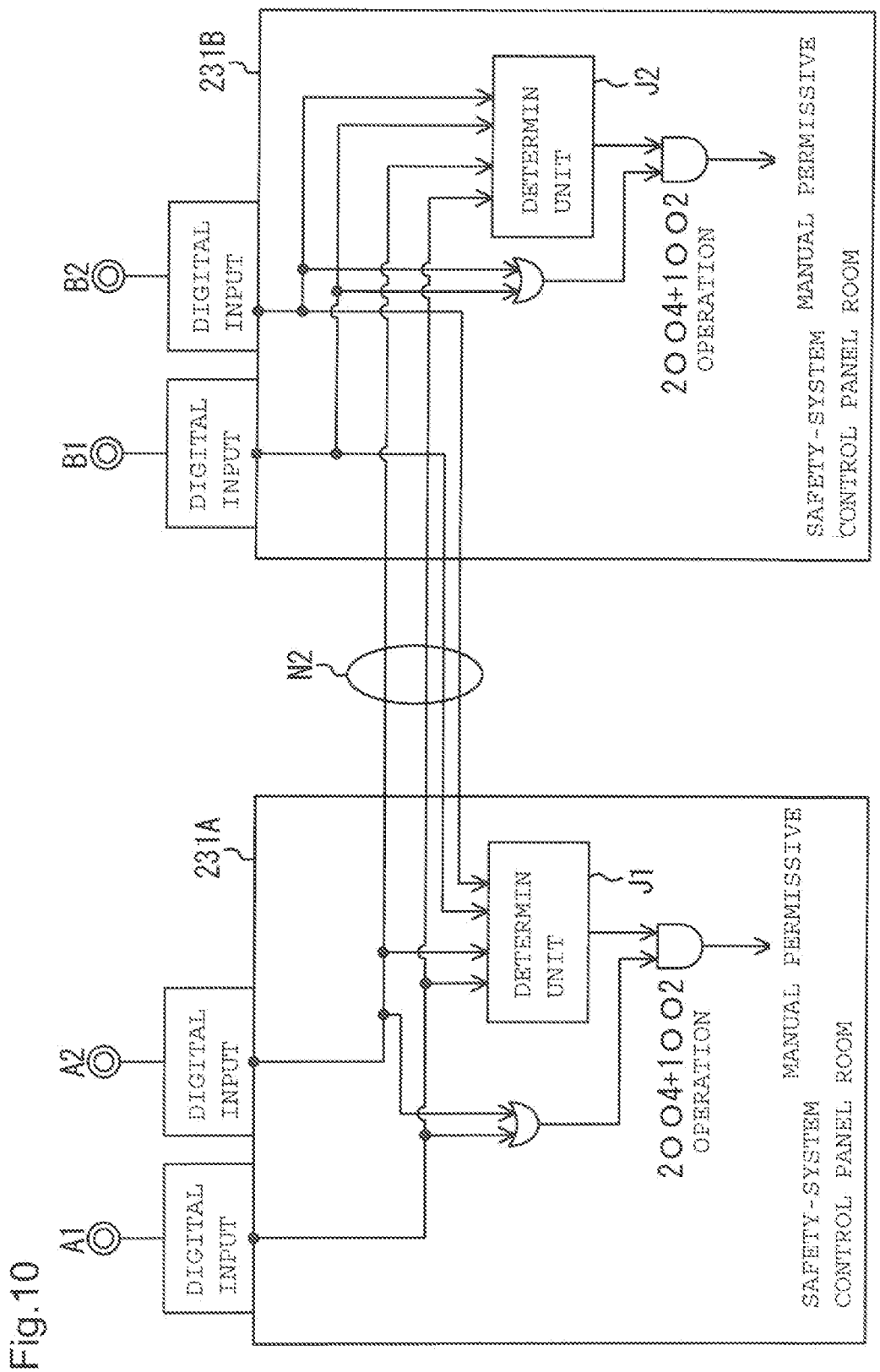
FIG. 10 is a circuit diagram showing the connection states of buttons of a first operating panel according to embodiment 5.

FIG. 10 is a circuit diagram showing the connection states of the buttons of the operating panel 11 in embodiment 5.

In embodiment 2, the operating panel 11 is provided with two buttons for each system, i.e., a total of four buttons, the operating panel 21 is provided with two buttons for each system, i.e., a total of four buttons, each of the determination units J1, J2 of the safety-system control devices 31A, 31B performs 2oo4 operation, and an AND operation of an OR operation of two operation signals in the own train and the above 2oo4 operation is performed (2oo4+1oo2 operation), whereby switching of control from the main control room 10 to the remote shutdown equipment 20 is performed. The switching operation based on such 2oo4+1oo2 operation is applicable also to another function that requires erroneous working prevention and function loss prevention.

For example, the 2oo4+1oo2 operation is applicable to manual permissive operation for blocking a nuclear reactor trip operation signal which becomes unnecessary depending on the operation state. The manual permissive operation is for intentionally blocking a safety-system function, and such an event that permissive operation for both trains erroneously works due to failure of another train is inappropriate for safety. Therefore, the 2oo4+1oo2 operation described in embodiment 2 can be favorably applied.

Figure 11:
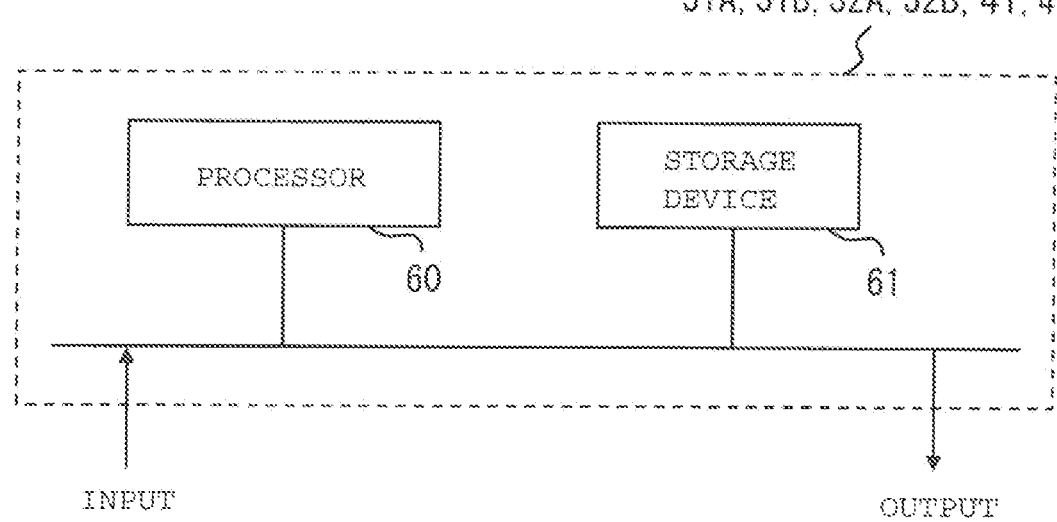
FIG. 11 shows the configuration of each control device.

The safety-system control devices 31A, 31B, the safety-system monitoring operation devices 32A, 32B, the regular-system control device 41, and the regular-system monitoring operation device 42 are composed of a processor 60 and a storage device 61, as shown in FIG. 11 which shows an example of hardware. Although not shown, the storage device 61 is provided with a volatile storage device such as a random access memory and a nonvolatile auxiliary storage device such as a flash memory.

Instead of the flash memory, an auxiliary storage device of a hard disk may be provided. The processor 60 executes a program inputted from the storage device 61. In this case, the program is inputted from the auxiliary storage device to the processor 60 via the volatile storage device. The processor 60 may output data such as an operation result to the volatile storage device of the storage device 61 or may store such data into the auxiliary storage device via the volatile storage device.

Although the disclosure is described above in terms of various exemplary embodiments and implementations, it should be understood that the various features, aspects, and functionality described in one or more of the individual embodiments are not limited in their applicability to the particular embodiment with which they are described, but instead can be applied, alone or in various combinations to one or more of the embodiments of the disclosure.

It is therefore understood that numerous modifications which have not been exemplified can be devised without departing from the scope of the present disclosure. For example, at least one of the constituent components may be modified, added, or eliminated. At least one of the constituent components mentioned in at least one of the preferred embodiments may be selected and combined with the constituent components mentioned in another preferred embodiment.

DESCRIPTION OF THE REFERENCE CHARACTERS

100 nuclear power plant
10 main control room
10T, 10TA, 10TB, 20T, 20TA, 20 TB touch panel
11, 21 operating panel
A1, A2, B1, B2, a1, a2, b1, b2 button
J1, J2 determination unit
20 remote shutdown equipment
30A, 30B safety-system control panel room
31A, 31B, 231A, 231B safety-system control device
32A, 32B safety-system monitoring operation device
40 regular-system control panel room
41 regular-system control device
42 regular-system monitoring operation device
N1, N2, N30A, N30B network
60 processor
61 storage device

The invention claimed is:

1. A control switching device for switching input/output to/from duplicated control devices from an input/output device located at a first place to an input/output device located at a second place, the control switching device comprising:
   a first operating panel having an A1 button and an A2 button connected to a first control device as the control device, and a B1 button and a B2 button connected to a second control device as the control device, the first operating panel being provided at the first place;
   a second operating panel having an a1 button and an a2 button connected to the first control device, and a b1 button and a b2 button connected to the second control device, the second operating panel being provided at the second place; and
   a network via which an operation signal of each button is sent/received between the first control device and the second control device, wherein
   the first control device includes first determination circuitry which determines whether or not to shut down input/output between the first control device and the input/output device located at the first place, on the basis of the operation signals of the A1 button, the A2 button, the B1 button, and the B2 button from the first operating panel, and determines whether or not to start input/output between the first control device and the input/output device located at the second place, on the basis of the operation signals of the a1 button, the a2 button, the b1 button, and the b2 button from the second operating panel, and
   the second control device includes second determination circuitry which determines whether or not to shut down input/output between the second control device and the input/output device located at the first place, on the basis of the operation signals of the A1 button, the A2 button, the B1 button, and the B2 button from the first operating panel, and determines whether or not to start input/output between the second control device and the input/output device located at the second place on the basis of the operation signals of the a1 button, the a2 button, the b1 button, and the b2 button from the second operating panel.

2. The control switching device according to claim 1, wherein
   the first control device enables button operation on the second operating panel only in a case where input/output between the first control device and the input/output device located at the first place is shut down, and
   the second control device enables button operation on the second operating panel only in a case where input/output between the second control device and the input/output device located at the first place is shut down.

3. The control switching device according to claim 2, wherein
   the first determination circuitry
      determines to shut down input/output between the first control device and the input/output device located at the first place, when two or more of the operation signals of the A1 button, the A2 button, the B1 button, and the B2 button from the first operating panel are received, and
      determines to start input/output between the first control device and the input/output device located at the second place, when two or more of the operation signals of the a1 button, the a2 button, the b1 button, and the b2 button from the second operating panel are received, and
   the second determination circuitry
      determines to shut down input/output between the second control device and the input/output device located at the first place, when two or more of the operation signals of the A1 button, the A2 button, the B1 button, and the B2 button from the first operating panel are received, and
      determines to start input/output between the second control device and the input/output device located at the second place, when two or more of the operation signals of the a1 button, the a2 button, the b1 button, and the b2 button from the second operating panel are received.

4. The control switching device according to claim 3, wherein
   the first place is a main control room of a nuclear power plant, and
   the second place is remote shutdown equipment located outside the main control room.

5. The control switching device according to claim 2, wherein
the first determination circuitry
determines to shut down input/output between the first control device and the input/output device located at the first place, when two or more of the operation signals of the A1 button, the A2 button, the B1 button, and the B2 button from the first operating panel are received and the operation signal of either the A1 button or the A2 button is received, and
determines to start input/output between the first control device and the input/output device located at the second place, when two or more of the operation signals of the a1 button, the a2 button, the b1 button, and the b2 button from the second operating panel are received, and
the second determination circuitry
determines to shut down input/output between the second control device and the input/output device located at the first place, when two or more of the operation signals of the A1 button, the A2 button, the B1 button, and the B2 button from the first operating panel are received and the operation signal of either the B1 button or the B2 button is received, and
determines to start input/output between the second control device and the input/output device located at the second place, when two or more of the operation signals of the a1 button, the a2 button, the b1 button, and the b2 button from the second operating panel are received.

6. The control switching device according to claim 5, wherein
the first place is a main control room of a nuclear power plant, and
the second place is remote shutdown equipment located outside the main control room.

7. The control switching device according to claim 2, wherein
all the buttons are configured to be physically, electrically, and functionally separate and independent of each other,
the first determination circuitry
determines to shut down input/output between the first control device and the input/output device located at the first place, when three or more of the operation signals of the A1 button, the A2 button, the B1 button, and the B2 button from the first operating panel are received, and
determines to start input/output between the first control device and the input/output device located at the second place, when three or more of the operation signals of the a1 button, the a2 button, the b1 button, and the b2 button from the second operating panel are received, and
the second determination circuitry
determines to shut down input/output between the second control device and the input/output device located at the first place, when three or more of the operation signals of the A1 button, the A2 button, the B1 button, and the B2 button from the first operating panel are received, and
determines to start input/output between the second control device and the input/output device located at the second place, when three or more of the operation signals of the a1 button, the a2 button, the b1 button, and the b2 button from the second operating panel are received.

8. The control switching device according to claim 7, wherein
the first place is a main control room of a nuclear power plant, and
the second place is remote shutdown equipment located outside the main control room.

9. The control switching device according to claim 2, wherein
the first place is a main control room of a nuclear power plant, and
the second place is remote shutdown equipment located outside the main control room.

10. The control switching device according to claim 2, wherein
the first control device and the second control device are control devices of a safety facility of a nuclear power plant.

11. The control switching device according to claim 1, wherein
the first determination circuitry
determines to shut down input/output between the first control device and the input/output device located at the first place, when two or more of the operation signals of the A1 button, the A2 button, the B1 button, and the B2 button from the first operating panel are received, and
determines to start input/output between the first control device and the input/output device located at the second place, when two or more of the operation signals of the a1 button, the a2 button, the b1 button, and the b2 button from the second operating panel are received, and
the second determination circuitry
determines to shut down input/output between the second control device and the input/output device located at the first place, when two or more of the operation signals of the A1 button, the A2 button, the B1 button, and the B2 button from the first operating panel are received, and
determines to start input/output between the second control device and the input/output device located at the second place, when two or more of the operation signals of the a1 button, the a2 button, the b1 button, and the b2 button from the second operating panel are received.

12. The control switching device according to claim 11, wherein
the first place is a main control room of a nuclear power plant, and
the second place is remote shutdown equipment located outside the main control room.

13. The control switching device according to claim 11, wherein
the first control device and the second control device are control devices of a safety facility of a nuclear power plant.

14. The control switching device according to claim 1, wherein
the first determination circuitry
determines to shut down input/output between the first control device and the input/output device located at the first place, when two or more of the operation signals of the A1 button, the A2 button, the B1 button, and the B2 button from the first operating panel are received and the operation signal of either the A1 button or the A2 button is received, and determines to start input/output between the first control device and the input/output device located at the second place, when two or more of the operation signals of the a1 button, the a2 button, the b1 button, and the b2 button from the second operating panel are received, and the second determination circuitry determines to shut down input/output between the second control device and the input/output device located at the first place, when two or more of the operation signals of the A1 button, the A2 button, the B1 button, and the B2 button from the first operating panel are received and the operation signal of either the B1 button or the B2 button is received, and determines to start input/output between the second control device and the input/output device located at the second place, when two or more of the operation signals of the a1 button, the a2 button, the b1 button, and the b2 button from the second operating panel are received.

15. The control switching device according to claim 14, wherein the first operating panel and the second operating panel are operating panels for performing permissive manual operation for performing block operation of a nuclear reactor trip function of a nuclear power plant.

16. The control switching device according to claim 14, wherein the first place is a main control room of a nuclear power plant, and the second place is remote shutdown equipment located outside the main control room.

17. The control switching device according to claim 1, wherein all the buttons are configured to be physically, electrically, and functionally separate and independent of each other, the first determination circuitry determines to shut down input/output between the first control device and the input/output device located at the first place, when three or more of the operation signals of the A1 button, the A2 button, the B1 button, and the B2 button from the first operating panel are received, and determines to start input/output between the first control device and the input/output device located at the second place, when three or more of the operation signals of the a1 button, the a2 button, the b1 button, and the b2 button from the second operating panel are received, and the second determination circuitry determines to shut down input/output between the second control device and the input/output device located at the first place, when three or more of the operation signals of the A1 button, the A2 button, the B1 button, and the B2 button from the first operating panel are received, and determines to start input/output between the second control device and the input/output device located at the second place, when three or more of the operation signals of the a1 button, the a2 button, the b1 button, and the b2 button from the second operating panel are received.

18. The control switching device according to claim 17, wherein the first place is a main control room of a nuclear power plant, and the second place is remote shutdown equipment located outside the main control room.

19. The control switching device according to claim 1, wherein the first place is a main control room of a nuclear power plant, and the second place is remote shutdown equipment located outside the main control room.

20. The control switching device according to claim 1, wherein the first control device and the second control device are control devices of a safety facility of a nuclear power plant.

\* \* \* \* \*